United States Patent [19]

Kawai et al.

[11] 4,201,159
[45] May 6, 1980

[54] ELECTRONIC CONTROL METHOD AND APPARATUS FOR COMBUSTION ENGINES

[75] Inventors: Hisasi Kawai, Toyohashi; Toshikazu Ina, Okazaki, both of Japan

[73] Assignee: Nippon Soken, Inc., Nishio, Japan

[21] Appl. No.: 885,076

[22] Filed: Mar. 9, 1978

[30] Foreign Application Priority Data

Mar. 23, 1977 [JP] Japan .................................. 52-32733
Aug. 3, 1977 [JP] Japan .................................. 52-93492

[51] Int. Cl.² .............................................. F02B 3/00
[52] U.S. Cl. ........................ 123/32 EB; 123/32 EE; 123/32 EA; 364/431
[58] Field of Search ........ 123/32 EA, 32 EB, 32 EE, 123/32 EL, 117 D, 148 E; 60/276, 285

[56] References Cited

U.S. PATENT DOCUMENTS

| | | | |
|---|---|---|---|
| 3,835,819 | 9/1974 | Anderson, Jr. | 123/117 D |
| 3,898,962 | 8/1975 | Honig et al. | 123/117 D |
| 3,931,808 | 6/1976 | Rachel | 123/32 EE |
| 3,935,846 | 2/1976 | Zelenka | 123/32 EB |
| 3,969,614 | 7/1976 | Moyer et al. | 123/117 D |
| 4,051,817 | 10/1977 | Hattori et al. | 123/32 EA |
| 4,057,042 | 11/1977 | Aono | 123/32 EE |
| 4,058,709 | 11/1977 | Long | 123/32 EA |
| 4,096,834 | 6/1978 | Norimada et al. | 60/276 |
| 4,117,807 | 10/1978 | Barnard | 123/32 EE |

*Primary Examiner*—Ronald H. Lazarus
*Assistant Examiner*—R. A. Nelli
*Attorney, Agent, or Firm*—Cushman, Darby & Cushman

[57] ABSTRACT

In a method and apparatus for controlling a combustion engine, a digital computer is adapted to calculate first and second values corresponding to optimal settings of fuel injectors and spark plugs in a time sequence by detecting changes of the amount of air flowing into the engine and the rotation speed of the engine. The computer is programmed to calculate the first and second values from first and second functions describing desired relationships among each setting of the fuel injectors and the spark plugs, the amount of air flowing into the engine and the rotation speed of the engine. An electronic control circuit in the form of a timer is coupled with the digital computer for generating an electric control signal with a predetermined period of time in response to the setting of the spark plugs and applying the control signal to the computer to halt the calculation of the first value during the predetermined period of time even if the computer is conditioned to calculate the first value, the remaining calculation of the first value being subsequently performed after lapse of the predetermined period of time.

9 Claims, 9 Drawing Figures

ELECTRONIC CONTROL METHOD AND APPARATUS FOR COMBUSTION ENGINES

BACKGROUND OF THE INVENTION

The present invention relates to an electronic control method and apparatus for an internal combustion engine, and more particularly to an improvement of an electronic control method and apparatus as described and claimed in a copending U.S. patent application Ser. No. 856,509 filed on Dec. 1, 1977 in the name of Hisasi Kawai et al.

In such a control apparatus for the engine, a digital computer is adapted to calculate first and second values corresponding to optimum settings of fuel injectors and spark plugs in accordance with binary electric signals respectively indicative of the air intake of the engine and rotation speed of the engine upon receiving therein a timing signal and a reference signal, the timing signal being produced with a predetermined phase lag in relation to the reference signal.

To perform the above-noted calculation, the computer is programmed to calculate the first and second values from a first function describing a desired relationship among setting of the fuel injectors, the amount of air flowing into the engine and the rotation speed of the engine and from a second function describing another desired relationship among setting of the spark plugs, the amount of air flowing into the engine and the rotation speed of the engine. The first calculated value is converted by a comparator into the setting of the fuel injectors in response to the timing signal and the second calculated value is converted by another comparator into the setting of the spark plugs in response to the reference signal.

In the control apparatus, if the calculation of the first value is conducted during the activation of the spark plugs, the computer is inevitably disturbed by various noises caused by the activation of the spark plugs. This results in erroneous calculation of the first value. In addition, if the amount of air may not properly be detected, for example, due to damage of an air flow meter, the calculations of the first and second values will be erroneously conducted.

SUMMARY OF THE INVENTION

It is, therefore, a primary object of the present invention to provide an improved electronic control method and apparatus for a combustion engine in which an electronic control circuit in the form of a timer is incorporated with the control apparatus to temporarily halt calculation of the first value in the computer during activation of the spark plugs.

It is another object of the present invention to provide an improved electronic control apparatus, having the above-mentioned characteristics, in which a throttle position sensor is incorporated with the control apparatus to detect a fully closed position and a fully opened position of a throttle valve so as to generate first and second electric signals respectively indicative of minimum and maximum values of the amount of air and wherein the computer is further programmed to discriminate whether or not the binary electric signal indicative of the amount of air is in an intermediate value between the minimum and maximum values and to determine the first and second values into a constant value respectively in accordance with the first and second electric signals from the throttle position sensor only when the binary electric signal indicative of the amount of air is not in the intermediate value.

In a preferred embodiment of the present invention, there is disclosed an electronic control apparatus for a combustion engine having an output shaft driven by mechanical energy converted from heat energy caused by the combustion of air-fuel mixture, the engine being provided thereon with fuel control means for controlling the amount of fuel metered into the engine and ignition control means for controlling the timing of the sparks supplied to the engine, the control apparatus comprising:

a first electronic circuit for generating a binary number electric signal indicative of the air intake of the engine; a second electronic circuit for generating a binary number electric signal indicative of the rotation speed of the output shaft;

detecting means for detecting a predetermined angular position of the output shaft to generate a first reset signal therefrom per one rotation of the output shaft;

means for generating a second reset signal with a predetermined phase lag in relation to the first reset signal from the detecting means;

a digital computer for repetitively calculating first and second values corresponding to respective settings of the fuel and ignition control means in accordance with the binary number electric signals from the first and second electronic circuits upon sequentially receiving the first and second reset signals, the computer being programmed to calculate the first and second values respectively from a first function describing a desired relationship among setting of the fuel control means, the air intake of the engine and the rotation speed of the output shaft and from a second function describing another desired relationship among setting of the ignition control means, the air intake and the rotation speed of the output shaft;

a third electronic circuit coupled between the digital computer and the fuel control means for converting the first calculated value into the setting of the fuel control means in response to the second reset signal; and a fourth electronic circuit coupled between the digital computer and the ignition control means for converting the second calculated value into the setting of the ignition control means in response to the first reset signal. The electronic control apparatus is characterized by provision of an electronic control circuit in the form of a timer which is coupled between the fourth electronic circuit and the digital computer for generating an electric control signal with a predetermined period of time in response to the setting of the ignition control means and applying the control signal to the computer to halt the calculation of the first value during the predetermined period of time defined by the control signal even if the computer is conditioned to calculate the first value in response to the second reset signal, the remaining calculation of the first value being subsequently performed after lapse of the predetermined period of time.

BRIEF DESCRIPTION OF THE DRAWINGS

Additional objects and advantages of the present invention will be more readily apparent from the following detailed description of a preferred embodiment thereof when taken together with the accompanying drawings in which.

DESCRIPTION OF THE PREFERRED EMBODIMENT

Figure 1:
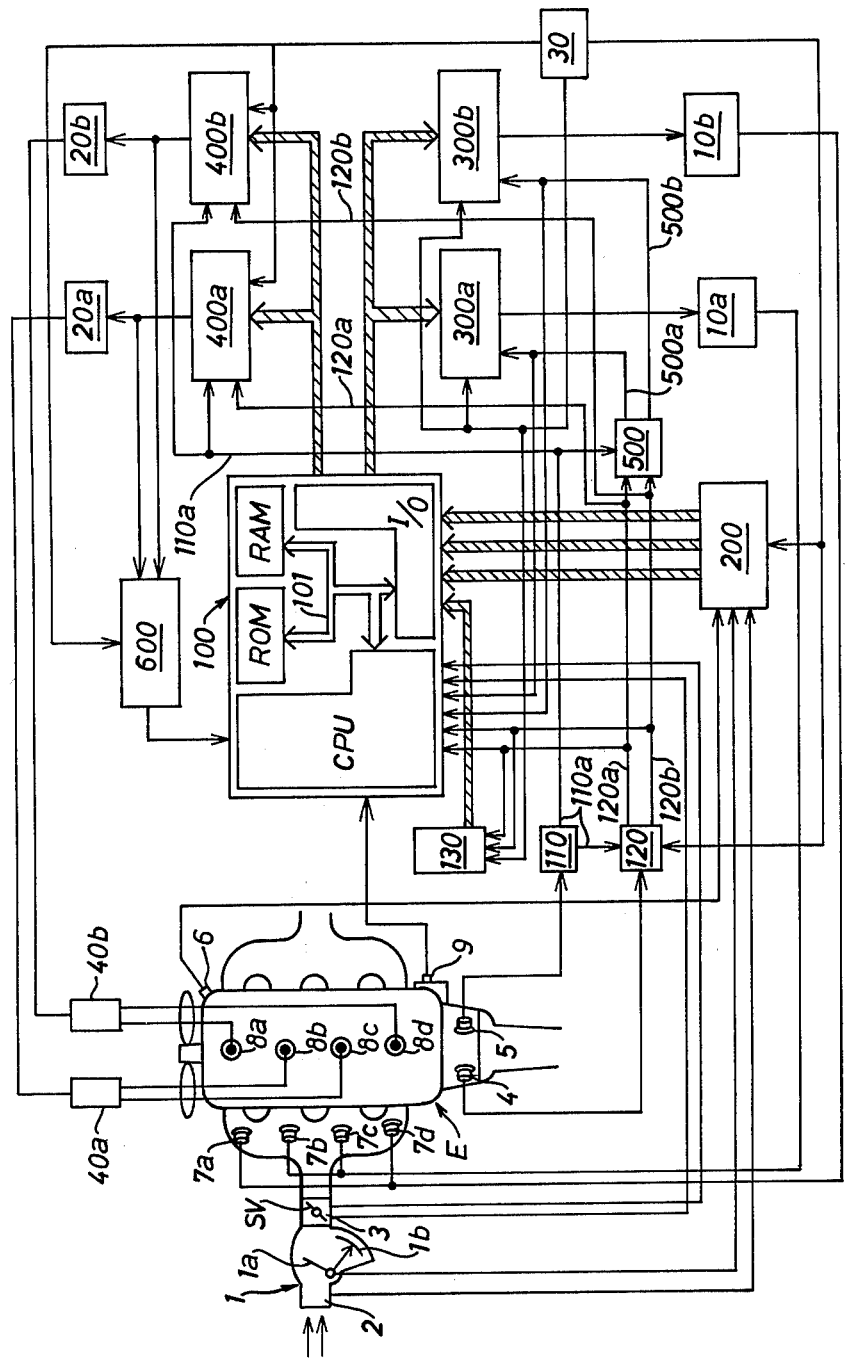
FIG. 1 is a schematic block diagram of an electronic control system for an internal combustion engine in accordance with the present invention.

Referring now to the accompanying drawings, in particular to FIG. 1, there is illustrated a schematic block diagram of an electronic control system for an internal combustion engine E in accordance with the present invention. The engine E is a four cylinder, four stroke internal combustion engine which includes four fuel injectors 7a to 7d mounted on an intake manifold and four spark plugs 8a to 8d mounted on a cylinder head. In operation of the combustion engine, the first and third cylinders are in their intake and exhaust strokes respectively when the second and fourth cylinders are respectively in their compression and power strokes. A crank-shaft of the engine E rotates once per a reciprocation of a piston within each cylinder.

The electronic control system comprises various sensors to detect operating conditions of the internal combustion engine E. An air flow meter 1 is provided as one of sensors within an induction passage of the engine E and includes a static plate 1a and a potentiometer 1b, of which the movable tap is coupled to the static plate 1a for detecting the air flowing through the induction passage. In this case, the air flow meter 1 acts to detect the air intake between maximum and minimum values. When the static plate 1a is moved in proportion to the air intake, an instant resistance value of the potentiometer 1b changes in proportion to the air intake. The air flow meter 1 is provided with a temperature sensor 2 to detect temperature of the air. A throttle position sensor 3 is provided within the induction passage and operatively connected to a throttle valve SV of the engine E. The throttle position sensor 3 detects a fully closed position and a fully opened position of the throttle valve SV respectively to generate first and second signals therefrom. The first and second signals from the sensor 3 are applied directly to a digital computer 100.

A reference signal generator 4 and a crankshaft position sensor 5 are respectively mounted on the cylinder block of the engine E. The reference signal generator 4 detects a predetermined angular position of the crankshaft before the arrival of second and third pistons to their top dead centers to generate a reference signal per one crankshaft rotation. On the other hand, the crankshaft position sensor 5 detects rotation speed of the crankshaft to generate angular phases at a frequency proportional to the rotation speed of the crankshaft. A coolant temperature sensor 6 is mounted on the cylinder block of the engine E to detect coolant temperature of the engine E, and a starter switch 9 is mounted on the cylinder block to detect start of the engine E.

The electronic control system further comprises an analog-to-digital converter 200 which is connected to the potentiometer 1b, the temperature sensor 2 and the coolant temperature sensor 6. The converter 200 receives respective output signals from the potentiometer 1b, the temperature sensor 2 and the coolant temperature sensor 6 to convert them into binary signals in response to clock pulses issued from a clock circuit 30. The binary signals from the converter 200 are transferred to the computer 100. In the electronic control system, a wave shaping circuit 110 is connected to the crankshaft position sensor 5 to receive therein the angular pulses from the sensor 5. Each of the angular pulses is reshaped by the wave shaping circuit 110 into a rectangular pulse a (See FIG. 2) which is applied through a line 110a to an electronic distributor 120, comparators 400a and 400b, and a delay circuit 500.

The electronic distributor 120 is connected to the reference signal generator 4 to receive the reference signal from the generator 4. The reference signal is modulated by the distributor 120 into a pair of first and second output pulses b and c (See FIG. 2) in response to rectangular pulses a from the wave shaping circuit 100 and clock pulses from the clock circuit 30. The second output pulse c has a 180° phase lag in relation to the first output pulse b. The first and second output pulses b and c are applied through lines 120a and 120b to the computer 100 as trigger signals and also to a rotation speed detector 130 and the delay circuit 500. The first output pulse b of the distributor 120 is further applied through the line 120a to the comparator 400a as a trigger signal, whereas the second output pulse c is further applied through the line 120b to the comparator 400b as a trigger signal. The rotation speed detector 130 receives clock pulses from the clock circuit 30 in response to the first and second output pulses b and c from the distributor 120 to convert each period of the first and second output pulses b and c into each reciprocal of rotation number. The reciprocal of the rotation number is applied to the computer 100 as binary signals. The delay circuit 500 functions to delay the first and second output pulses b and c from the distributor 120 with a predetermined phase angle in response to rectangular pulses a from the wave shaping circuit 110, thereby to generate first and second timing signals d and e (See FIG. 2). In this case, the predetermined phase angle described above is larger than the angle between the top dead center of the piston and the angular position of the crankshaft detected by the reference signal generator 4.

The digital computer 100 is a micro-computer of TLCS-12A type manufactured by TOKYO-SHIBAURA ELECTRIC COMPANY in Japan and comprises a central processing unit or CPU which is connected by way of a data bus 101 to an input-output device or I/O, a read only memory or ROM and a random access memory or RAM. I/O receives binary signals issued from the rotation speed detector 130 and the analog-to-digital converter 200 to temporarily store them in RAM. The stored binary signals in RAM are selectively read out and applied by I/O to CPU through the data bus 101. In the embodiment, first and second programs are previously stored within ROM so that CPU calculates a first data from a first function describing a desired relationship between operating conditions of the engine E and optimum settings of the fuel injectors 7a to 7d and also calculates a second data from a second function describing a desired relationship between operating conditions of the engine E and optimum settings of the spark plus 8a to 8d. The desired relationships noted above are determined experimentally and stored in ROM by means of the programs. CPU is triggered by receiving the first and second timing signals d and e from the delay circuit 500 to start calculation of the first data for controlling the fuel injectors 7a to 7d as shown by i in FIG. 2. CPU is also triggered by the first and second output pulses b and c from the electronic distributor 120 to start calculation of the second data for controlling the spark plugs 8a to 8d, as shown by f in FIG. 2. The calculation of the first and second data in CPU are respectively executed in a time-sharing method by using binary signals from I/O by means of programming in ROM. The calculated first and second data are respectively transferred as binary numbers to comparators 300a and 300b and to the comparators 400a and 400b by means of I/O.

Furthermore, a third program is previously stored within ROM so that CPU discriminates whether or not the binary electric signal indicative of the amount of air is in an intermediate value between maximum and minimum values of the amount of the air and to determine the first and second data into a constant value respectively in accordance with the first and second electric signals from the throttle position sensor 3 only when the binary electric signal indicative of the amount of air is not in the intermediate value. The maximum and minimum values and constant value described above are determined experimentally and stored in ROM by means of the third program. The determined constant value in CPU is transferred to the comparators 300a and 300b or to the comparators 400a and 400b.

The comparator 300a is connected through a line 500a to the delay circuit 500 and is triggered by the first timing signal d from the delay circuit 500 to convert the first calculated data into a first output pulse j with a predetermined injection pulse-width (See FIG. 2) in response to clock pulses from the clock circuit 30. The first output pulse j from the comparator 300a is applied to an injector drive circuit 10a which drives the second and third fuel injectors 7b and 7c. Meanwhile, the comparator 300b is connected through a line 500b to the delay circuit 500 and is triggered by the second timing signal e from the delay circuit 500 to convert the first calculated data into a second output pulse k with a predetermined injection pulse-width (See FIG. 2) in response to clock pulses from the clock circuit 30. The second output pulse k from the comparator 300b is applied to an injector drive circuit 10b which drives the first and fourth injectors 7a and 7d.

The comparator 400a is connected through the line 120a to the distributor 120 and is triggered by the first output pulse b from the distributor 120 to convert the second calculated data into low and high level signals $g_1$ and $g_2$ (See FIG. 2) in response to clock pulses from the clock circuit 30 and rectangular pulses a from the wave shaping circuit 110. The low level signal $g_1$ is applied as a first spark advance signal to an ignitor 20a to energize an ignition coil 40a, and subsequently the high level signal $g_2$ is applied to the ignitor 20a to deenergize the ignition coil 40a. This causes activation of the second and third spark plugs 8b and 8c.

Meanwhile, the comparator 400b is connected through the line 120b to the distributor 120 and is triggered by the second output pulse c from the distributor 120 to convert the second calculated data into low and high level signals $h_1$ and $h_2$ (See FIG. 2) in response to clock pulses from the clock circuit 30 and rectangular pulses a from the wave shaping circuit 110. The low level signal $h_1$ is applied as a second spark advance signal to an ignitor 20b to energize an ignition coil 40b, and subsequently the high level signal $h_2$ is applied to the ignitor 20b to deenergize the ignition coil 40b. This causes activation of the first and fourth spark plugs 8a and 8d.

In summary, with the comparators 400a and 400b, it will be understood that the second and third spark plugs 8b and 8c produce sparks therefrom at the trailing edge of the first spark advance signal $g_1$ and the first and fourth spark plugs 8a and 8d produce sparks therefrom at the trailing edge of the second spark advance signal $h_1$.

In the electronic control system, it should be clearly pointed out that provision of an electronic control circuit 600 in the form of a timer is the most important subject matter to complete the present invention. As shown in FIG. 3, the timer 600 comprises a NAND gate 601 which receives at its input terminals the low and high level signals $g_1$ and $h_2$ in FIG. 2 from the comparators 400a and 400b or the high and low level signals $g_2$ and $h_1$ in FIG. 2 from the comparators 400a and 400b to generate at its output terminal a reset or high level signal $l_1$ or $l_3$ shown in FIG. 2. When the NAND gate 101 receives at its input terminals the high level signals $g_2$ and $h_2$ respectively from the comparators 400a and 400b, it generates at its output terminal a low level signal $l_2$ or $l_4$ shown in FIG. 2. This means that the reset signal $l_1$ or $l_3$ synchronizes at its trailing edge with the trailing edge of the low level signal $g_1$ or $h_1$ from the comparator 400a or 400b.

Figure 2:
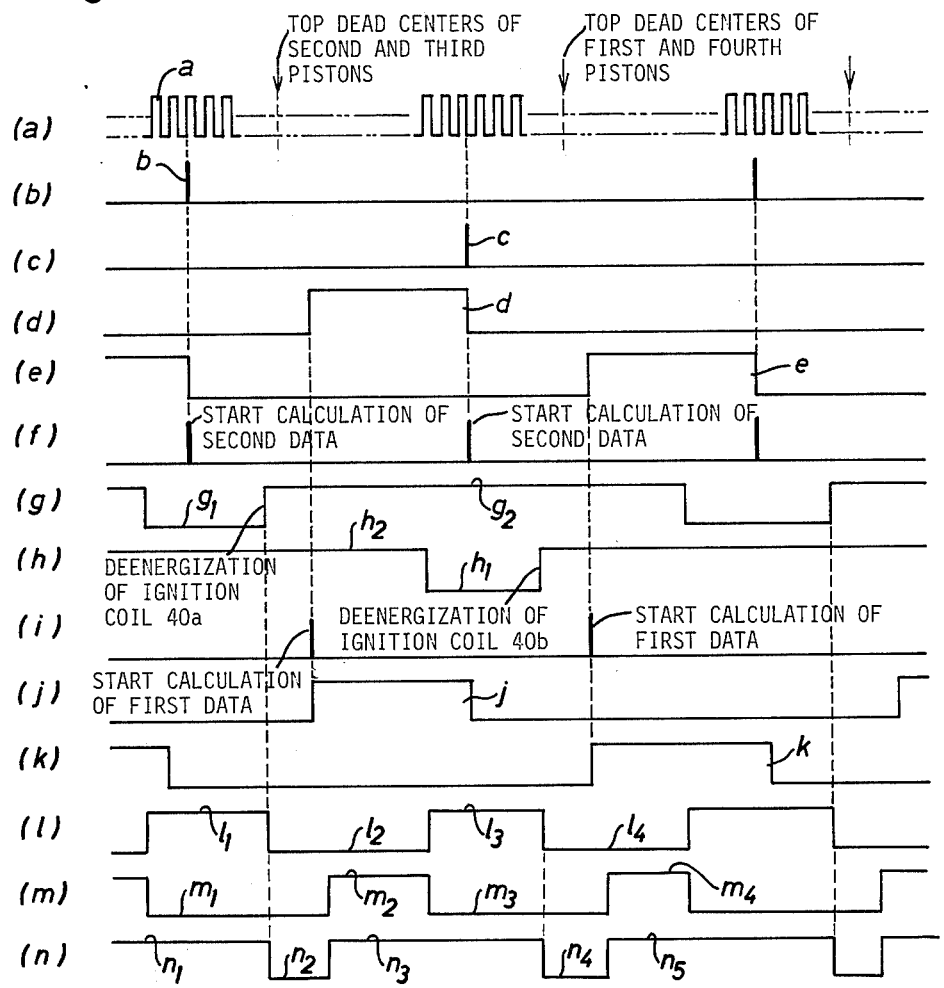
FIG. 2 illustrates wave forms obtained at various points in the control system of FIG. 1.
Figure 3:
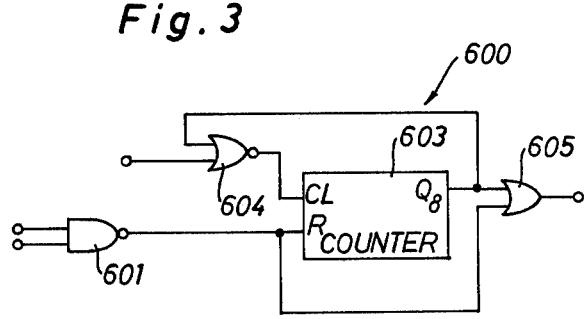
FIG. 3 is a circuit diagram of an embodiment of the electronic timer illustrated in block form in FIG. 1.

The timer 600 further comprises a binary counter 603 which is reset by the reset signal $l_1$ or $l_3$ from the NAND gate 601 to generate at its terminal $Q_8$ a low level signal $m_1$ or $m_3$ shown in FIG. 2. The low level signal $m_1$ or $m_3$ is applied to a NOR gate 604 and an OR gate 605. Then, the NOR gate 604 generates a series of output pulses therefrom in response to the low level signal $m_1$ or $m_3$ from the counter 603 and clock pulses from the clock circuit 30. Meanwhile, the OR gate 605 maintains a high level signal $n_1$ or $n_3$ (See FIG. 2) described below in response to the reset signal $l_1$ or $l_3$ from the NAND gate 601 and the low level signal $m_1$ or $m_3$ from the counter 603. Then, the high level signal $n_1$ or $n_3$ from the OR gate 605 is continuously applied to an OH terminal (not shown) of the TLCS-12A microcomputer, which is used as the computer 100, to maintain calculation of the second data in the computer 100.

When the counter 603 is released from its reset condition at the trailing edge of the reset signal $l_1$ or $l_3$, it starts to count the output pulses from the NOR gate 604 so as to continuously generate the low level signal $m_1$ or $m_3$ therefrom. Then, the OR gate 605 generates a low level signal $n_2$ or $n_4$ (See FIG. 2) therefrom in response to the low level signal $l_2$ or $l_4$ from the NAND gate 601 and the low level signal $m_1$ or $m_3$ from the counter 603. This means that the low level signal $n_2$ or $n_4$ from the OR gate 605 synchronizes at its leading edge with the trailing edge of the high level signal $l_1$ or $l_3$ from the NAND gate 601. Thus, the low level signal $n_2$ or $n_4$ from the OR gate 605 is applied to the OH terminal of the computer 100 to temporarily halt the calculation of the first data in the computer 100.

Upon completing the count of a predetermined number of the output pulses from the NOR gate 604, the counter 603 generates at its terminal $Q_8$ a high level signal $m_2$ or $m_4$ (See FIG. 2) which is applied to the NOR gate 604 and the OR gate 605. In this case, the counted number of the output pulses is experimentally defined to correspond with a period of time necessary for sparks at each spark plug after deenergization of each ignition coil. When the NOR gate 604 generates a high level signal therefrom in response to the high level signal $m_2$ or $m_4$ from the counter 603 and clock pulses from the clock circuit 30, the high level signal from the NOR gate 604 is applied to the terminal CL of the counter 603 to stop operation of the counter 603. Simultaneously, the OR gate generates the above-mentioned high level signal $n_3$ or a high level signal $n_5$ in response to the low level signal $l_2$ or $l_4$ from the NAND gate 601 and the high level signal $m_2$ or $m_4$ from the counter 603. This means that the high level signal $n_3$ or $n_5$ from the OR gate 605 synchronizes at its leading edge with the leading edge of the high level signal $m_2$ or $m_4$ from the counter 603. Thus, the high level signal $n_3$ or $n_5$ from the OR gate 605 is applied to the OH terminal of the computer 100 to permit the remaining calculation of the computer 100 after lapse of the period of time necessary for the sparks at each spark plug.

Hereinafter, function of the timer 600 will be described in relation to operation of the comparators 400a and 400b in detail. Assuming that low and high level signals $g_1$ and $h_2$ are respectively generated from the comparators 400a and 400b, the low level signal $g_1$ is applied to the ignitor 20a, whereas the high level signal $h_2$ is applied to the ignitor 20b. Then, the ignition coil 40a is energized by the ignitor 20a due to the low level signal $g_1$. When the ignition coil 40a is deenergized by the ignition 20a at the trailing edge of the low level signal $g_1$, a high electric voltage is generated from the ignition coil 40a and applied to the second and third spark plugs 8b and 8c. Thus, the spark plugs 8b and 8c are activated to produce sparks therefrom. Meanwhile, the igntion coil 40b is maintained in its deenergized condition by the ignitor 20b due to the high level signal $h_2$. Thus, the first and fourth spark plugs 8a and 8d cannot be activated.

During the above-noted energization of the ignition coil 40a, when the NAND gate 601 generates a reset signal $l_1$ therefrom in response to the low and high level signals $g_l$ and $h_2$ from the comparators 400a and 400b, the counter 603 is reset by the reset signal $l_1$ to generate at its terminal $Q_8$ a low level signal $m_1$ (See FIG. 2), as previously described. Then, a high level signal $n_1$ continuously appears from the OR gate 605 in response to the reset and low level signals $l_l$ and $m_1$ from the NAND gate 601 and the counter 603 and is applied to the OH terminal of the computer 100. This maintains calculation of the second data conducted by the computer 100 in response to a first output pulse from the distributor 120.

Subsequently, upon the above-noted deenergization of the ignition coil 40a, the counter 603 starts to count output pulses from the NOR gate 604 at the trailing edge of the reset signal $l_1$ from the NAND gate 601, as previously described. In this state, the counter 603 continues to generate the low level signal $m_1$ therefrom. Then, a low level signal $n_2$ appears from the OR gate 605 in response to the low level signals $l_2$ and $m_1$ from the NAND gate 601 and the counter 603 and is applied to the OH terminal of the computer 100. This temporarily halts calculation of the first data which will be conducted by the computer 100 in response to a first timing signal d from the delay circuit 500 during or after lapse of the period of time necessary for sparks at the spark plugs 8b and 8c. When the counter 603 completes to count the predetermined number of the output pulses from the NOR gate 604, it generates a high level signal $m_2$ therefrom. Then, a high level signal $n_3$ appears from the OR gate 605, as previously described, and is applied to the OH terminal of the computer 100. This resumes the remaining calculation of the first data in the computer 100.

Furthermore, when high and low level signals $g_2$ and $h_1$ are respectively generated from the comparators 400a and 400b, the low level signal $h_1$ is applied to the ignitor 20b, whereas the high level signal $g_2$ is applied to the ignitor 20a. Then, the ignition coil 40b is energized by the ignitor 20b due to the low level signal $h_1$. When the ignition coil 40b is deenergized by the ignitor 20b at the trailing edge of the low level signal $h_1$, the first and fourth spark plugs 8a and 8d are activated by a high electric voltage from the ignition coil 40b to produce sparks therefrom. Meanwhile, the ignition coil 40a is maintained in its deenergized condition by the ignitor 20a due to the high level signal $g_2$ so that the second and third spark plugs 8b and 8c cannot be activated.

During the above-noted energization of the ignition coil 40b, when the NAND gate 601 generates a reset signal $l_3$ therefrom in response to the high and low level signals $g_2$ and $h_1$, the counter 603 is reset by the reset signal $l_3$ to generate a low level signal $m_3$ therefrom. Then, the high level signal $n_3$ continuously appears from the OR gate 605 in response to the reset and low level signals $l_3$ and $m_3$ and is applied to the OH terminal of the computer 100. This maintains calculation of the second data which is conducted by the computer 100 in response to a second output pulse c from the distributor 120.

Subsequently, upon the above-noted deenergization of the ignition coil 40b, the counter 603 starts to count output pulses from the NOR gate 604 at the trailing edge of the reset signal $l_3$. Then, a low level signal $n_4$ appears from the OR gate 605 in response to the low level signals $l_4$ and $m_3$, as previously described, and is applied to the OH terminal of the computer 100. This temporarily halts calculation of the first data which will be conducted by the computer 100 in response to a second timing signal e from the delay circuit 500 during or after lapse of the period of time necessary for sparks at the spark plugs 8a and 8d. When the counter 603 completes to count the predetermined number of the output pulses from the NOR gate 604, it generates a high level signal $m_4$ therefrom. Then, a high level signal $n_5$ appears from the OR gate 605, as previously described, and is applied to the OH terminal of the computer 100. This resumes the remaining calculation of the first data in the computer 100.

From the above description, it will be understood that the timer 600 functions to temporarily halt the calculation of the first data in the computer 100 upon deenergization of the ignition coil 40a or 40b and to resume the remaining calculation after activation of the second and third spark plugs 8b and 8c or the first and fourth spark plugs 8a and 8d is completed. Thus, the calculation in the computer 100 is smoothly conducted under control of the timer 600 regardless of various noises caused by the spark plugs 8a to 8d.

Hereinafter, service routine of the digital computer 100 will be described in detail. The service routine is improved to determine first and second data by using the first and second electric signals from the throttle position sensor 3 in case the air flow meter 1 is unavailable for detecting the instantaneous air intake in accordance; with operating condition of the engine E.

1. Computer Calculation of First Data for Fuel Injectors

A first data $D_T$ for the fuel injectors 7a to 7d is calculated by the digital computer 100 from the following relationship:

$$D_{96} = K_O \cdot (Q/N) \quad (1)$$

Where $K_O$ is a proportional constant and where $Q/N$ is the air intake/rotation number N. This relationship; is stored in ROM of the computer 100. The maximum and minimum values Qmax and Qmin of an amount Q of the sucked air intake are also stored in ROM in such a manner that CPU can discriminate whether the air flow meter 1 is available or not.

Figure 4:
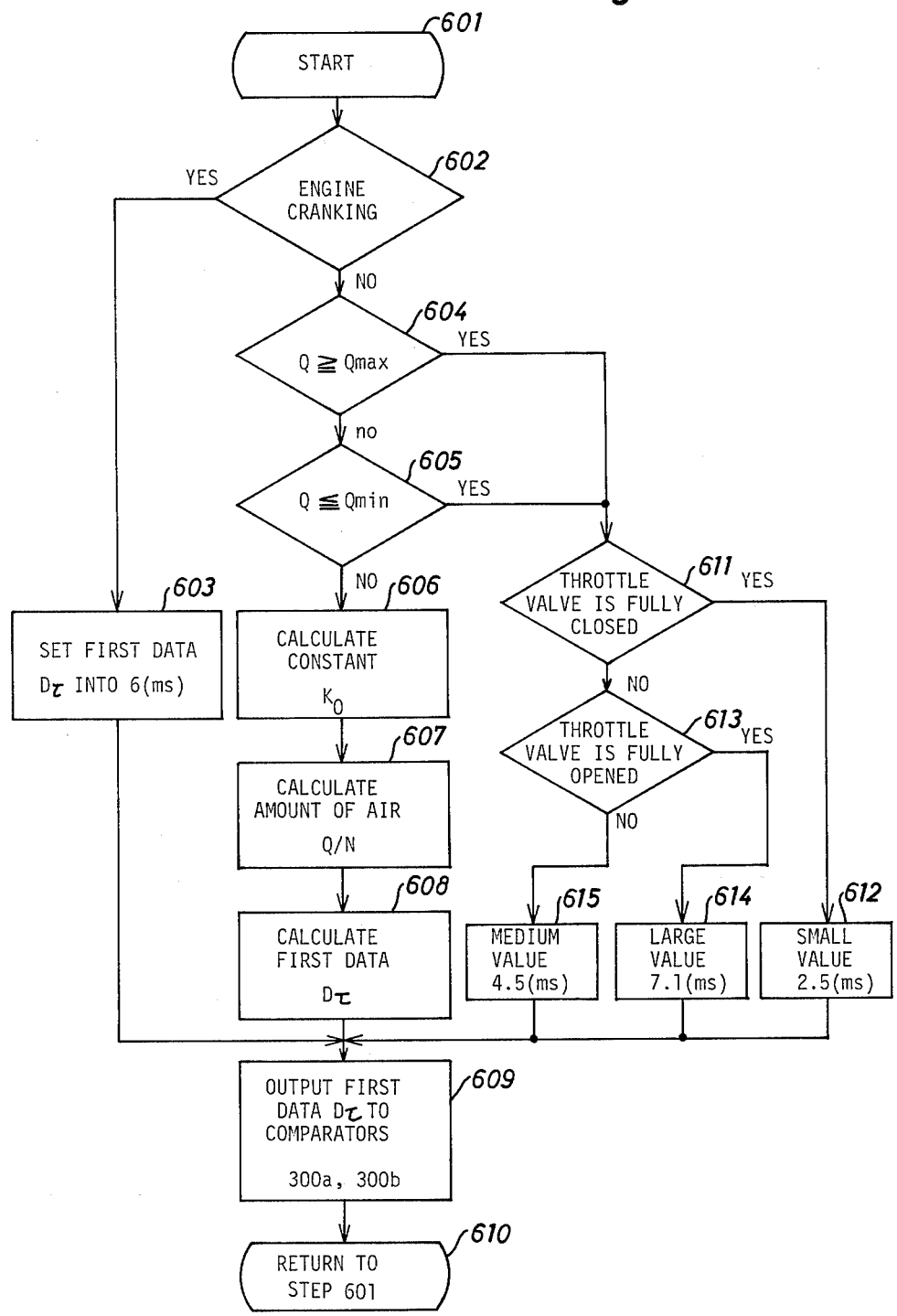
FIG. 4 is a flow diagram illustrating execution of the digital computer as it is used to control fuel metering in the engine.

In FIG. 4, there is illustrated a flow diagram for calculating the first data. The computer program is entered at a step 601 when CPU is triggered by the first timing signal from the delay circuit 500. At a step 602, a determination is made as to whether the engine E is cranked or not. To make this determination, CPU receives an output signal from the starter switch 9 to determine whether a level of the output signal is greater than a predetermined value or not. If the answer to this question is "yes", then the engine is being cranked and the program proceeds to a step 603. At this step 603, the first data $D_T$ is set to a predetermined value 6 (ms) and thereafter at a step 609, the first data $D_{96}$ is transferred to the comparators 300a and 300b. If the answer to the above question is "no", cranking of the engine E is completed and the program proceeds to a step 604. At the step 604, CPU receives the binary signal from the converter 200, the binary signal corresponding with an amount Q of the sucked air. Then, CPU reads out the stored value Qmax from ROM and a determination is made as to whether the amount Q is larger than the value Qmax or not.

If the answer to this question is "yes", the air flow meter 1 is unavailable and the program proceeds to a step 611. At the step 611, CPU receives the first electric signal from the throttle position sensor 3 to determine as to whether the throttle valve SV is in the fully closed position or not. If the valve SV is in the fully closed position, the program proceeds to a following step 612 and the first data $D_T$ is set to a predetermined small value 2.5 (ms). Thereafter, at a step 609, the first data $D_{96}$ is transferred to the comparators 300a and 300b. If the throttle valve SV is not in the fully closed position, the program proceeds to a step 613 and CPU receives the second electric signal from the throttle position sensor 3 to make a determination as to whether the throttle valve SV is in fully opened position or not. If the valve SV is the fully opened position, the program proceeds to a step 614 and the first data $D_{96}$ is set to a predetermined large value 7.1 (ms). Thereafter, at the step 609, the first data is transferred to the comparators 300a and 300b. If the valve SV is not in fully opened position, the program proceeds to a step 615 and the first data D is set to a predetermined medium value 4.5 (ms). Thereafter, at the step 609, the first data is transferred to the comparators 300a and 300b.

If the answer to the question at the above-mentioned step 604 is "no", the program proceeds to a step 605. At this step 605, CPU receives the binary signal from the converter 200 and reads out the stored value Qmin from ROM. Then, a determination is made as to whether the amount Q of air is smaller than the minimum value Qmin or not. If the answer to this question is "yes", the program proceeds to the step 611. Thereafter, at the following steps 612 to 615, the first data $D_T$ is determined and set to one of the predetermined values 2.5 (ms), 4.5 (ms) and 7.1 (ms) in response to the electric signals from the throttle position sensor 3, as described above.

If the answer to the question at the step 605 is "no", the air flow meter 1 is available and the program preceeds to a step 606. At this step 606, CPU receives first and second signals from the throttle position sensor 3 and the binary signal from the converter 200, the binary signal corresponding with an output signal from the engine coolant temperature sensor 6. Thus, a proportional constant $K_O$ is calculated and stored in the computer 100.

After calculation of the constant $K_O$, the program proceeds to a step 607. At this step 607, CPU receives digital numbers from the rotation speed detectors 130 and digital signals from the converter 200, the digital signals being inversely in proportion to an amount Q of the air intake. Then, the digital numbers from the detector 130 are divided by the digital signals from the converter 200, and the divided value Q/N and the reciprocal of rotation number N are temporarily stored for use in calculation of the second data. When the program proceeds from the step 607 to a following step 608, the divided value Q/N and the constant $K_O$ are read out by CPU and the value Q/N is multiplied by the constant $K_O$. Thus, the multiplied value $K_O Q/N$ is transferred as a first data $D_T$ to the comparator 300a. In addition, when CPU is triggered by the second timing signal from the delay circuit 500, repeated is a service routine which is substantially the same as the above routine. As a result, another first data is transferred to the comparator 300b.

2. Computer Calculation of Second Data for Spark Plugs

Figure 5:
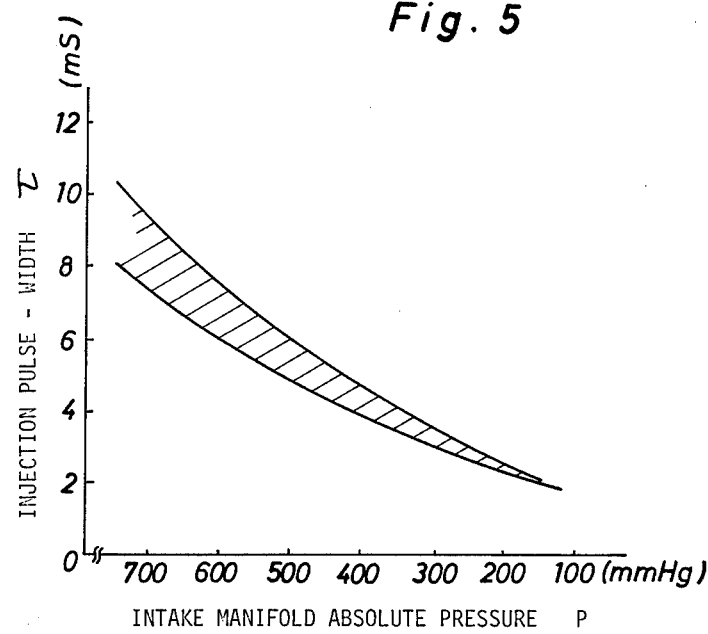
FIG. 5 is a graph of intake manifold absolute pressure P versus fuel injection pulse-width $\tau$.
Figure 6:
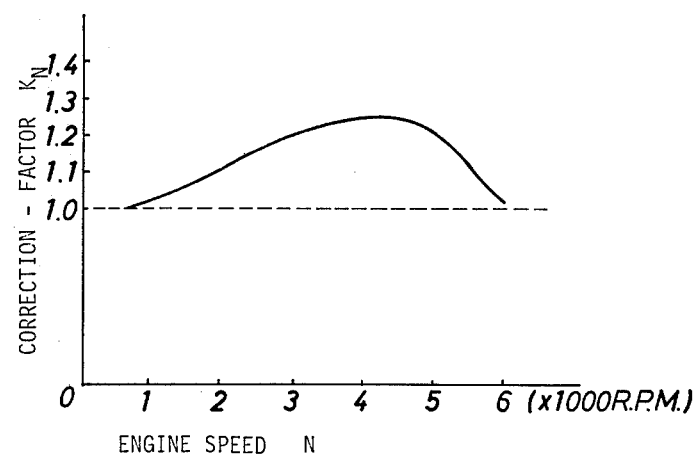
FIG. 6 is a graph of correction-factor $K_N$ versus engine speed N.
Figure 7:
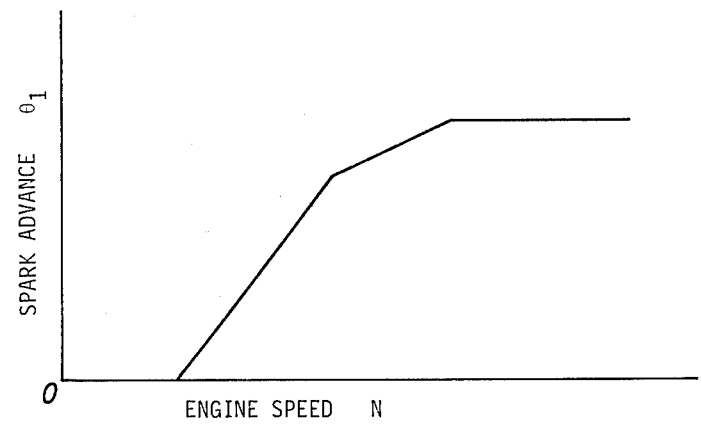
FIG. 7 is a graph of engine speed N versus spark advance $\theta_1$.
Figure 8:
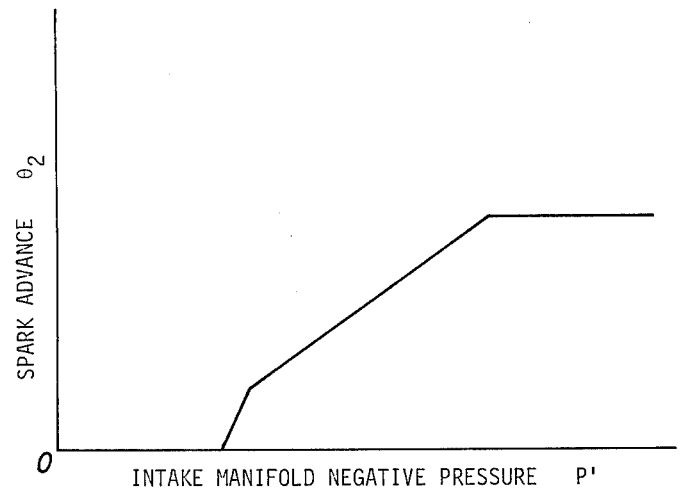
FIG. 8 is a graph of intake manifold negative pressure P' versus spark advance $\theta_2$.

A second data is calculated by the digital computer 100 from the relationships given by the respective characteristic curves shown in FIGS. 5 and 6 and the characteristic curves shown in FIGS. 7 and 8. In FIG. 7, rotation speed advance angle $\theta_1$ is plotted on the ordinate axis and rotation number N is plotted on the abscissa. In FIG. 8, vacuum advance angle $\theta_2$ is plotted on the ordinate axis and intake manifold negative pressure P' is plotted on the abscissa. The relationships given by the curves shown in FIGS. 5, 6, 7 and 8 are previously stored in ROM.

Figure 9:
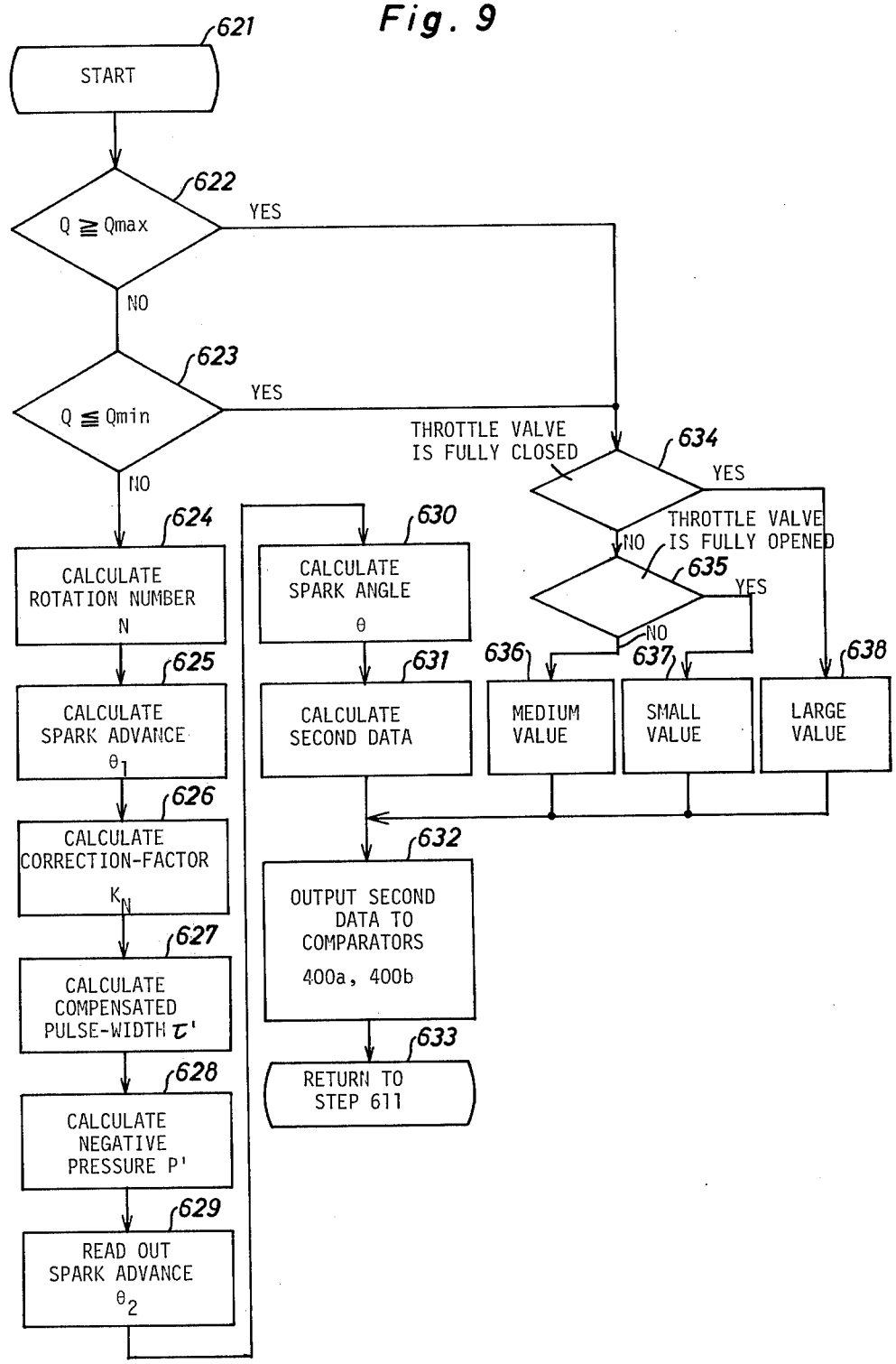
FIG. 9 is a flow diagram illustrating execution of the digital computer as it is used to control ignition spark timing.

FIG. 9 is a flow diagram illustrating the calculation of the second data. In the flow diagram, at a step 621 the computer program is entered when CPU is triggered by the first output pulse from the electronic distributor 120. When the program proceeds to a step 622, CPU receives the binary signal from the converter 200, the binary signal corresponding with an amount Q of the air intake. Then, CPU reads out the stored maximum value Qmax from ROM and a determination is made as to whether the amount Q is larger than the maximum value Qmax or not.

If the answer to this question is "yes", the air flow meter 1 is unavailable and the program proceeds to a step 634. At the step 634, CPU receives the first electric signal from the throttle position sensor 3 to determine as to whether the throttle valve SV is in the fully closed position or not. If the valve SV is in the fully closed position, the program proceeds to a step 638 and the second data is set to a predetermined larger value. Thereafter, at a following step 632, the second data is transferred to the comparators 400a and 400b. If the valve SV is not in the fully closed position, the program proceeds to a step 635 and CPU receives the second electric signal from the throttle position sensor 3 to make a determination as to whether the throttle valve SV is in fully opened position or not. If the valve SV is in fully opened position, the program proceeds to a step 637 and the second data is set to a predetermined small value. Thereafter, the second data is also transferred to the comparators 400a and 400b. If the valve SV is not in fully opened position, the second data is set to a predetermined medium value at a step 636 and transferred to the comparators 400a and 400b at the step 632.

If the answer to the question at the above-mentioned step 622 is "no", the program proceeds to a step 623. Then, CPU receives the binary signal from the converter 200 and reads out the stored minimum value Qmin from ROM. Subsequently, a determination is made as to whether the amount Q is smaller than the value Qmin. If the answer to this question is "yes", the program proceeds to the step 634. Thereafter, at the following steps 635 to 638, the second data is determined and set to one of the above-mentioned predetermined values in response to the electric signals from the throttle position sensor 3.

If the answer to the question at the above-mentioned step 623 is "no", the air flow meter 1 is available and the program proceeds to a step 624. At this step 624, CPU reads out the reciprocal of rotation number N to calculate rotation number N from the reciprocal I/N. Then, at steps 625 and 626, a spark advance angle $\theta_1$ and a correction factor $K_N$ shown in FIGS. 7 and 6 are respectively read out from ROM in relation to the rotation N. When the program preceeds to the following step 626, the value Q/N is read out and divided by the correction-factor $K_N$ obtained at the step 626. The divided value $Q/NK_N$ is represented as a compensated injection pulse-width $\tau'$ which corresponds with pulse-width $\tau$ indicated by the bottom curve in FIG. 5. Then, the program proceeds to a step 628 in which an intake manifold absolute pressure P shown in FIG. 5 is read out from ROM in relation to the compensated pulse-width $\tau'$. Thereafter, an actual negative pressure P' is obtained by subtracting the absolute pressure P from the atmospheric pressure $P_O$.

At the following step 629, a vacuum advance angle $\theta_2$ shown in FIG. 8 is read out from ROM in relation to the negative pressure P'. The advance angles $\theta_1$ and $\theta_2$ obtained at the steps 625 and 629 are added to each other at a step 630 so that a desired or retard angle $\theta$ is obtained by subtracting the added value $\theta_1 + \theta_2$ from the predetermined reference angle before the top dead center position of the piston. When the program proceeds to a step 631, the advance angle $\theta$ is calculated as the second data and at a final step 632 the second data obtained at the step 631 is transferred to the comparator 400a. When CPU is triggered by the second output pulse from the distributor 120, repeated is a service routine which is substantially the same as the above routine. As a result, another second data is transferred to the comparator 400b. From the above description, it will be understood that the first and second data may be effectively obtained from the computer 100 even if the air flow meter 1 is unavailable.

Having now forth set structure and operation of a preferred embodiment of the concept underlying the present invention, various other embodiments as well as certain variations and modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. In an electronic control apparatus for a combustion engine having an output shaft driven by mechanical energy converted from heat energy caused by the combustion of air-fuel mixture, said engine being provided thereon with fuel control means for controlling the amount of fuel metered into said engine and ignition control means for controlling the timing of the sparks supplied to said engine, the control apparatus comprising:

a first electronic circuit for generating a binary number electric signal indicative of the air intake of said engine;

a second electronic circuit for generating a binary number electric signal indicative of the rotation speed of said output shaft;

detecting means for detecting a predetermined angular position of said output shaft to generate a first reset signal therefrom per one rotation of said output shaft;

means for generating a second reset signal with a predetermined phase lag in relation to the first reset signal from said detecting means;

a digital computer for repetitively determining first and second values corresponding to respective settings of said fuel and ignition control means in accordance with the binary number electric signals from said first and second electronic circuits upon sequentially receiving the first and second reset signals, said computer determining the first and second values respectively from a first function describing a desired relationship among the setting of said fuel control means, the air intake of said engine and the rotation speed of said output shaft and from a second function describing another desired relationship among the setting of said ignition control means, the air intake of said engine and the rotation speed of said output shaft;

a third electronic circuit coupled between said digital computer and said fuel control means for converting the first calculatec value into the setting of said fuel control means in response to the second reset signal; and a fourth electronic circuit coupled between said digital computer and said ignition control means for converting the second calculated value into the setting of said ignition control means in response to the first reset signal;

the improvement wherein an electronic control circuit is coupled between said fourth electronic circuit and said digital computer for generating an electric control signal with a predetermined period of time in response to the setting of said ignition control means, said control signal being applied to said computer to halt the determination of the first value during the predetermined period of time defined by the control signal even if said computer is conditioned to determine the first value in response to the second reset signal, the remaining determination of the first value being subsequently performed after lapse of the predetermined period of time.

2. An electronic control apparatus as set forth in claim 1, further comprising a clock circuit for generating a clock signal with a predetermined time interval, and wherein said control circuit comprises a counter for counting a predetermined number of the clock signal in response to the setting of said ignition control means to generate an output signal defining the said predetermined period of time; and means for applying the output signal from said counter to said digital computer to halt the calculation of the first value during the said predetermined period of time even if said computer is conditioned to calculate the first value in response to the second reset signal, the remaining calculation of the first value being subsequently performed after lapse of the predetermined period of time.

3. An electronic control apparatus as set forth in claim 1, further comprising second detecting means for detecting a fully closed position and a fully opened position of a throttle valve for control of the air intake of said engine to generate first and second electric signals respectively indicative of closed and open positions of said throttle valve, which in turn corresponds to amounts of air intake, and means for discriminating whether or not the binary electric signal from said first electronic circuit is an intermediate value between predetermined minimum and maximum values and determining the first and second values employing, respectively, said minimum and maximum values in accordance with the first and second electric signals from said second detecting means only when the binary electric signal from said first electronic circuit is not in the said intermediate value.

4. In an electronic control apparatus for a combustion engine having an output shaft driven by mechanical energy converted from heat energy caused by the combustion of air-fuel mixture, said engine being provided thereon with a plurality of fuel control means for controlling the amount of fuel metered into said engine and a plurality of ignition control means for controlling the timing of the sparks supplied to said engine, the control apparatus comprising:

fist detecting means for detecting the amount of air flowing into said engine to generate an output signal therefrom;

a first electronic circuit, responsive to the output signal from said first detection means, for generating a binary number electric signal indicative of the amount of air;

second detecting means for detecting rotation speed of said output shaft during operation of said engine to generate a speed signal therefrom;

a second electronic circuit, responsive to the speed signal from said second detecting means, for generating a binary number electric signal indicative of the rotation speed of said output shaft;

third detecting means for detecting a predetermined angular position of said output shaft before the arrival of a piston to its top dead center to generate a reference signal therefrom per one rotation of said output shaft;

an electronic distributor arranged to be operated in response to the reference signal to generate a plurality of output signals in a variable time interval in accordance with changes of the rotation speed of said output shaft;

delay means for generating a plurality of timing signals with a predetermined phase lag in relation to each of the output signals from said distributor;

a digital computer for repetitively determining first and second values corresponding to respective settings of said fuel and ignition control means in accordance with the binary number electric signals from said first and second electronic circuits upon sequentially receiving the timing signals from said delay means and the output signals from said distributor, said computer determining the first and second values respectively from a first function describing a desired relationship among the setting of said fuel control means, the amount of air flowing into said engine and the rotation speed of said output shaft and from a second function describing another desired relationship among the setting of said ignition control means, the amount of air flowing into said engine and the rotation speed of said output shaft;

a third electronic circuit coupled between said digital computer and said fuel control means for converting the first calculated value into the settings of said fuel control means in response to the timing signals from said delay means; and a fourth electronic circuit coupled between said digital computer and said ignition control means for converting the calculated value into the setting of said ignition control means in response to the output signals from said distributor;

the improvement wherein an electronic control circuit in the form of a timer is coupled between said fourth electronic circuit and said digital computer for generating an electric control signal with a predetermined period of time in response to the setting of said ignition control means, said control signal being applied to said computer to halt the determination of the first value during the predetermined period of time defined by the control signal even if said computer is conditioned to determine the first value in response to one of the timing signals, the remaining determination of the first value being subsequently performed after lapse of the predetermined period of time.

5. An electronic control apparatus as set forth in claim 4, further comprising a clock circuit for generating a clock signal with a predetermined time interval, and wherein said control circuit comprises a NAND gate coupled with said fourth electronic circuit for generating a high level signal in response to one of the settings of said ignition control means and generating a low level signal upon completing sparks in said engine;

a counter coupled with said NAND gate to be reset by the high level signal from said NAND gate, said counter counting a predetermined number of the clock signal in response to the low level signal from said NAND gate to generate a low level signal defining the said predetermined period of time and to generate a high level signal upon completion of the count thereof; and an OR gate coupled between said counter and said computer to generate a low level signal in response to the low level signals from said NAND gate and said counter and to generate a high level signal in response to the low level signal from said NAND gate and the high level signal from said counter, the low level signal from said OR gate being applied to said computer to halt the calculation of the first value during the said predetermined period of time even if said computer is conditioned to calculate the first value in response to one of the timing signals, and the high level signal from said OR gate being applied to said computer to subsequently perform the remaining calculation of the first value after lapse of the predetermined period of time.

6. An electronic control apparatus as set forth in claim 4, further comprising:

fourth detecting means for detecting a fully closed position and a fully opened position of a throttle valve for control of the air intake of said engine to generate first and second electric signals respectively indicative of closed and open positions of said throttle valve, which in turn correspond to minimum and maximum amounts of air intake, and means for discriminating whether or not the binary electric signal from said first electronic circuit is an intermediate value between predetermined minimum and maximum values and determining the first and second values employing, respectively, said minimum and maximum values in accordance with the first and second electric signals from said fourth detecting means only when the binary electric signal from said first electronic circuit is not in the said intermediate value.

7. A method for controlling a combustion engine having an output shaft driven by the combustion of air-fuel mixture, said engine being provided thereon with fuel control means for controlling the amount of fuel supplied to said engine and ignition control means for controlling the timing of ignition sparks supplied to said engine, the method comprising the steps of:

generating binary number electric signals respectively indicative of operating conditions of said engine;

determining first and second values corresponding to respective settings of said fuel and ignition control means in accordance with the binary number electric signals, said determining step being performed in a time sequence by a digital computer programmed to determine the first and second values according to a first function describing a desired relationship between the setting of said fuel control means and operating conditions of said engine and according to a second function describing another desired relationship between the setting of said injection control means and operating conditions of said engine;

converting the first and second values calculated in said calculating step into respective settings of said fuel and ignition control means in the said time sequence;

producing an electric control signal with a predetermined period of time in response to the setting of said ignition control means;

applying the electric control signal to said digital computer to halt said calculating step for the first value for a period including the generation of said ignition sparks even if said computer is conditioned to calculate the first value, the remaining calculation of the first value being subsequently performed after lapse of the predetermined period of time; and repeating above sequence of steps at a predetermined angular interval of rotation of said output shaft.

8. A method as set forth in claim 7, wherein the step of generating binary number electric signals indicative of operating conditions of said engine comprises the steps of:

generating a first binary number electric signal indicative of the air intake of said engine; and generating a second binary number electric signal indicative of the rotation speed of said output shaft, and wherein said calculating step is performed in accordance with the first and second binary electric signals.

9. A method as set forth in claim 8, further comprising the steps of:

detecting a fully closed position and a fully opened position of a throttle valve for control of the amount of air flowing into said engine to generate first and second electric signals respectively indicative of closed and open positions of said throttle valve;

discriminating, by said computer, whether or not the first binary electric signal indicative of the amount of air is an intermediate value between predetermined minimum and maximum values; and determining the first and second values employing, respectively, said minimum and maximum values in accordance with the first and second electric signals only when the first binary electric signal indicative of the amount of air is not in the said intermediate value.

* * * * *